United States Patent [19]

Hamano et al.

[11] Patent Number: 4,730,517
[45] Date of Patent: Mar. 15, 1988

[54] HELICAL PLANETARY GEAR ASSEMBLY

[75] Inventors: Hideo Hamano; Keiji Takeshita; Yasumichi Funato, all of Toyota, Japan

[73] Assignee: Toyota Jidosha Kabushiki Kaisha, Toyota, Japan

[21] Appl. No.: 900,893

[22] Filed: Aug. 27, 1986

[30] Foreign Application Priority Data

Aug. 27, 1985 [JP] Japan .................................. 60-130248

[51] Int. Cl.$^4$ .............................................. F16H 3/44
[52] U.S. Cl. ..................... 74/785; 74/750 R
[58] Field of Search .............. 74/785, 750 R, 665 GD, 74/769

[56] References Cited

U.S. PATENT DOCUMENTS

| | | | |
|---|---|---|---|
| 3,477,314 | 11/1969 | Rutkowski | 74/750 R |
| 3,780,601 | 12/1973 | Dach et al. | 74/750 R |
| 4,026,167 | 5/1977 | Archer | 74/750 R |
| 4,074,591 | 2/1978 | Dick | 74/785 |
| 4,103,753 | 8/1978 | Holdemann | 74/750 R |
| 4,347,762 | 9/1982 | Holdemann | 74/785 |
| 4,440,042 | 4/1984 | Holdeman | 74/785 |
| 4,604,908 | 8/1986 | Dolan | 74/785 |

Primary Examiner—Leslie Braun
Assistant Examiner—David Novais
Attorney, Agent, or Firm—Oblon, Fisher, Spivak, McClelland & Maier

[57] ABSTRACT

A helical planetary gear assembly includes a ball bearing secured to a housing, a carrier sleeve coupled with an inner race of the ball bearing and being axially restrained by engagement therewith, an input shaft supported by the ball bearing through the carrier sleeve, an output shaft arranged coaxially with the input shaft for rotation relative thereto, a sun gear secured to the input shaft for rotation therewith, a ring gear secured to an internal wall of the housing, a planet carrier arranged between the sun and ring gears, and a plurality of planet gears rotatably supported by the planet carrier and being in meshing engagement with the sun and ring gears, the gears each being in the form of a helical gear. The planet carrier includes a body member secured to the carrier sleeve for rotation therewith, and the input shaft is axially restrained by opposite ends of the carrier sleeve through a pair of axially spaced thrust bearings.

5 Claims, 3 Drawing Figures

HELICAL PLANETARY GEAR ASSEMBLY

BACKGROUND OF THE INVENTION

1. Field of the Invention

The present invention relates to a planetary gear assembly, and more particularly to a helical planetary gear assembly, for example, adapted for use in the power transfer device of a four-wheel drive vehicle.

2. Description of the Prior Art

In U.S. Pat. No. 4,440,042 issued on Apr. 3, 1984, there has been proposed a helical planetary gearz assembly which includes a housing, a ball bearing secured to the housing, an input shaft journalled in the ball bearing, an output shaft arranged coaxially with the input shaft and journalled in the housing for rotation relative to the input shaft, a sun gear splined to the input shaft for rotation therewith, a thrust washer interposed between the ball bearing and sun gear, a ring gear secured to the housing, a planet carrier free to float radially, and a plurality of planet gears supported by the carrier and being in meshing engagement with the sun and ring gears, all the gears having helical gear teeth. In this helical planetary gear assembly, thrust loads on the sun gear are absorbed by the housing through the thrust washer and ball bearing in one axial direction and through the input shaft in the other axial direction, thrust loads on the ring gear are absorbed directly by the housing, and the planet carrier is axially restrained by a locater plate between the sun gear and thrust washer and contiguous thereto such that thrust loads on the planet gears are absorbed by the housing through the locater plate, thrust washer and ball bearing or through the locater plate, sun gear and input shaft.

In the above arrangement, thrust loads on the planet gears will cause wear between the sun gear and locater plate during relative rotation thereof. For this reason, in the case that the helical planetary gear assembly is adapted to transfer large drive torque therethrough, there will occur durability problems in the sun gear and locater plate. Furthermore, in the above arrangement, the meshing engagement of the planet gears with the sun and ring gears will fluctuate due to radial displacement of the planet carrier in a speed reduction mode. It is, therefore, difficult to maintain the meshing engagement among the gears in a predetermined condition. This results in noise and vibration and in a decrease of power transmission efficiency.

SUMMARY OF THE INVENTION

It is, therefore, a primary object of the present invention to provide an improved helical planetary gar assembly wherein thrust loads on the planet gears are absorbed by the housing without causing any problem described above and wherein the input shaft is axially restrained in a reliable manner irrespectively of any undesired axial gap caused by accumulation of tolerance of mounting parts for the output shaft.

According to the present invention, the object is attained by providing a helical planetary gear assembly which includes a housing, a bearing secured to a side wall of the housing, a carrier sleeve coupled with the bearing and being axially and radially restrained by engagement with the bearing, a first shaft rotatably supported by the bearing through the carrier sleeve, a second shaft arranged coaxially with the first shaft for rotation relative thereto, a sun gear fixedly mounted on the first shaft for rotation therewith, a ring gear arranged concentrially with the sun gear and secured to an internal wall of the housing, a planet carrier rotatably arranged between the sun and ring gears, a plurality of planet gears rotatably supported by the planet carrier and being in meshing engagement with the sun and ring gears, the gears each being in the form of a helical gear, and a clutch sleeve axially slidably mounted on the second shaft and shiftable between a first position in which it effects a direct drive connection between the first and second shafts and a second position in which it is engaged with the planet carrier for transmitting drive torque from the first shaft to the second shaft through the gears, wherein the planet carrier includes a body member secured to the carrier sleeve for rotation therewith and wherein the first shaft is axially restrained by opposite ends of the carrier sleeve through a pair of axially spaced thrust bearings.

Preferably, the bearing secured to the housing is in the form of a radial ball bearing, the carrier sleeve is coupled with an inner race of the ball bearing for rotation therewith, and the first shaft is rotatably supported by the carrier sleeve through a radial needle bearing. It is also preferable that one of the thrust bearings is disposed between one end of the carrier sleeve and an annular stepped portion of the first shaft while the other thrust bearing is disposed between the other end of the carrier sleeve and a stopper member fixed to the first shaft.

With the above arrangement of the helical planetary gear assembly, thrust loads on the sun and planet gears are absorbed by the housing through one of the thrust bearings, the carrier sleeve and the bearing or through the first shaft, and other thrust bearing, the carrier sleeve and the bearing. This is effective to axially restrain the planet carrier without causing any durability problem in the sun gear. It is further noted that the carrier sleeve is useful to axially restrain the first shaft irrespectively of any undesired axial gap caused by accumulation if tolerance of mounting parts for the second shaft.

BRIEF DESCRIPTION OF THE DRAWINGS

Other objects and many of the attendant advantages of the present invention will be readily appreciated as the same becomes better understood by reference to the following detailed description when considered in connection with the accompanying drawings, in which like reference numerals designate the same or similar parts throughout the figures thereof any and wherein.

DETAILED DESCRIPTION OF THE PREFERRED EMBODIMENT

Figure 1:
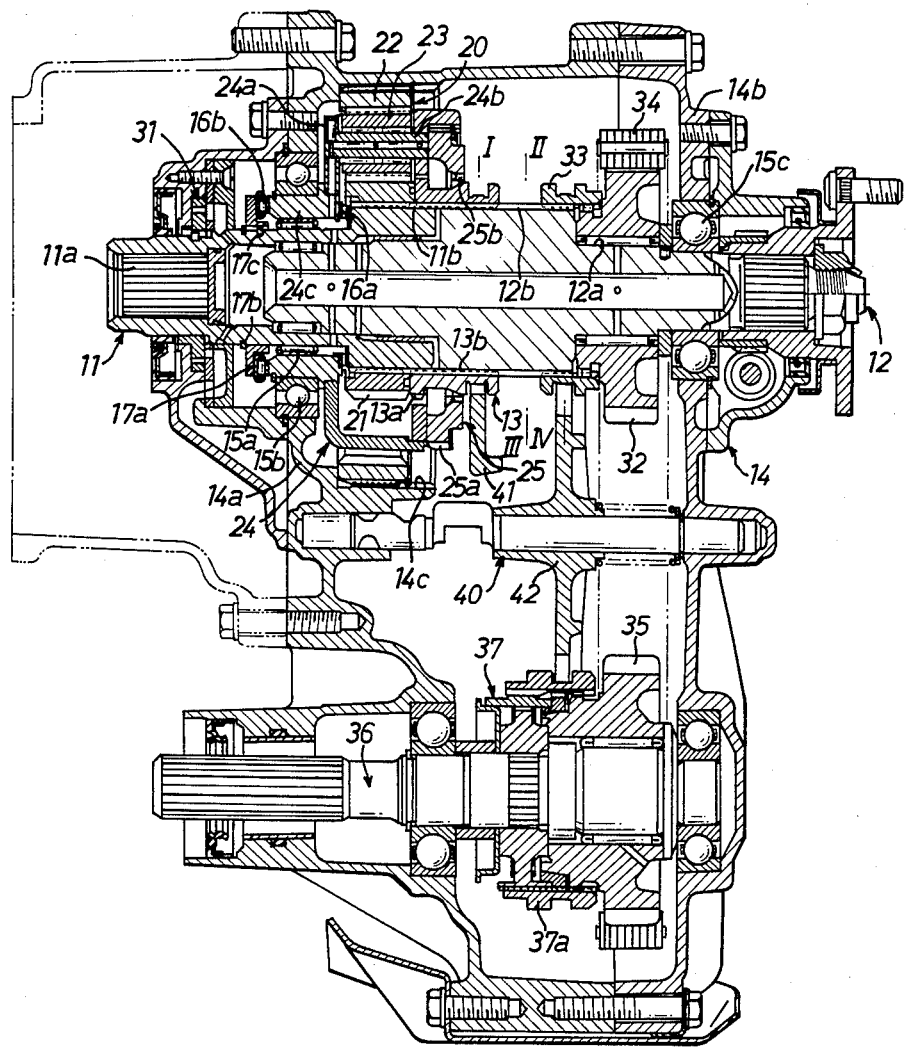
FIG. 1 is a sectional view showing a helical planetary gear assembly in accordance with the present invention which is used in the power transfer device in a four-wheel drive vehicle.

Referring now to the drawings, particularly in FIG. 1, there is illustrated a helical planetary gear assembly 20 in accordance with the present invention which is adapted as an auxiliary change-speed transmission in the power transfer device for a four-wheel drive vehicle. The power transfer device includes a housing assembly 14 which consists of front and rear casings 14a and 14b secured to each other in a fluid-tight manner, an input shaft 11 rotatably mounted on a side wall of front casing 14a, and a first output shaft 12 arranged coaxially with the input shaft 11 and rotatably mounted on a side wall of rear casing 14b for rotation relative to the input shaft 11.

The input shaft 11 is rotatably supported on the side wall of front casing 14a through a radial needle bearing 15a, a carrier sleeve 24c and a radial ball bearing 15b. The input shaft 11 has an internally splined portion 11a for connection to an output shaft of a power transmission (not shown) and an externally splined portion 11b for mounting thereon the helical planetary gear assembly 20. An oil pump 31 is mounted on the input shaft 11 at the outside of front casing 14a and contained within a bearing retainer secured in a fluid-tight manner to the side wall of front casing 14 to supply lubricating oil to bearing portions and intermeshed portions in the transfer device.

The first output shaft 12 is rotatably supported at an intermediate portion thereof on the side wall of rear casing 14b through a radial ball bearing 15c and is rotatably coupled at its left-hand end within a hollow portion of input shaft 11 through a radial needle bearing. The first output shaft 12 is formed with a journal portion 12a and an externally splined hub portion 12b and has a right-hand end for connection to rear wheel drive axles of the vehicle (not shown). A clutch sleeve 13 has an external spline 13a and an internal spline 13b axially slidably engaged with the externally splined hub portion 12b of output shaft 12 and engageable with the externally splined portion 11b of input shaft 11 for establishing a direct drive mode when shifted leftward in the figure.

The helical planetary gear assembly 20 comprises a sun gear 21 fixedly mounted on the externally splined portion 11b of input shaft 11 for rotation therewith, a stationary ring gear 22 arranged concentrically with sun gear 21 and secured to an internal cylindrical wall 14c of front casing 14a, a planet carrier 24 rotatably arranged between sun gear 21 and ring gear 22, and a plurality of planet gears 23 each rotatably supported by a plurality of circumferentially spaced lateral pins 24b which are secured to a body member 24a of planet carrier 24, the planet gears 23 being in meshing engagement with sun gear 21 and ring gear 22. The gears 21, 22 and 23 each are in the form of a helical gear. The planetary gear assembly 20 further comprises an annular side gear plate 25 integrally fixed at an externally splined portion 25a thereof to planet carrier 24 for rotation therewith and has an internal spline 25b which is arranged to be engaged with the external spline 13a of clutch sleeve 13. When the clutch sleeve 13 is axially shifted rightward to engage the internal spline 25b of side gear plate 25 at its external spline 13a, the planetary gear assembly 20 acts to transfer drive torque from the input shaft 11 to the first output shaft 12 therethrough at a predetermined reduction speed ratio.

Figure 2:
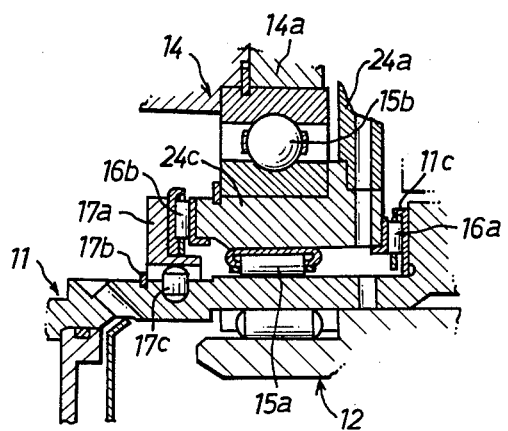
FIG. 2 is an enlarged sectional view showing details of the helical planetary gear assembly shown in FIG. 1.

In the planetary gear assembly 20, the radial ball bearing 15b is secured to the side wall of front casing 14a by means of the bearing retainer. As is clearly illustrated in FIG. 2, the carrier sleeve 24c is detachably coupled with radial ball bearing 15b and is axially restrained by engagement with an inner race of radial ball bearing 15b when coupled therewith. The body member 24a of planet carrier 24 is secured at its inner periphery to the inner end of carrier sleeve 24c for rotation therewith. The input shaft 11 is rotatably supported by the carrier sleeve 24c through the radial needle bearing 15a and is axially supported by the opposite ends of carrier sleeve 24c through a pair of axially spaced thrust bearings 16a and 16b. The inside thrust bearing 16a is disposed between the inner end of carrier sleeve 24c and an annular stepped portion 11c of input shaft 11, while the outside thrust bearing 16b is disposed between the outer end of carrier sleeve 24c and an annular stopper plate 17a which is fixedly mounted on the input shaft 11 by means of a snap ring 17b and a radial pin 17c. Thus, the input shaft 11 is axially restrained by means of the carrier sleeve 24c. With the above arrangement, the gears 21, 22, 23 and planet carrier 24 can be previously mounted as a unit on the input shaft 11 through the radial needle bearing 15a and thrust bearing 16a to be mounted on the wall of front casing 14a through the radial ball bearing 15b.

The power transfer device further includes a drive sprocket 32 rotatably mounted on the journal portion 12a of output shaft 12, an internally splined clutch sleeve 33 axially slidably mounted on the externally splined hub portion 12b of output shaft 12 to be engaged with the drive sprocket 32, a driven sprocket 36 rotatably mounted on a second output shaft 36 and drivingly connected to the drive sprocket 32 by means of a drive chain 34, and a synchronizer 37 mounted on the second output shaft 36 to connect the driven sprocket 35 to the second output shaft 36. The second output shaft 36 is arranged in parallel with the input and output shafts 11, 12 and is rotatably mounted within the housing assembly 14. The second output shaft 36 has an externally splined portion for connection to front wheel drive axles (not shown).

The power transfer device further includes a shift mechanism 40 arranged between the input and output shafts 11, 12 and between the output shafts 12, 36 to shift the clutch sleeves 13, 33 and synchronizer 37 for selectively establishing high or low speed drive mode and two or four wheel drive mode. The shift means 40 comprises a first shift fork 41 coupled with the clutch sleeve 13 and a second shift fork 42 coupled with the clutch sleeve 33 and a clutch sleeve 37a of synchronizer 37. The first shift fork 41 is shifted between first and second position I and II by means of a manual shift lever (not shown) which is operated by a driver of the vehicle between positions H4 and L4 in a shift pattern shown in FIG. 3. When the first shift fork 41 is in the first position I, the clutch sleeve 13 is disengaged from the internal spline 25b of side gear plate 25 and engaged with the externally splined portion 11b of input shaft 11 to effect direct connection between input and output shafts 11 and 12. When the first shift fork 41 is shifted to the second position II and retained in position, the clutch sleeve 13 is disengaged from the externally splined portion 11b of input shaft 11 and engaged with the internal spline 25b of side gear plate 25 to drivingly connect the input shaft 11 to the first output shaft 12 through the planetary gear assembly 20.

Figure 3:
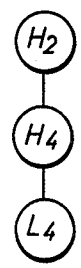
FIG. 3 illustrate a shift pattern of the power transfer device shown in FIG. 1.

The second shift fork 42 is shifted between third and fourth positions III and IV by means of the manual shift lever which is also operated by the driver between position H4 and H2 in the shift pattern shown in FIG. 3. When the second shift fork 42 is in the fourth position IV, the clutch sleeve 33 is engaged with the drive sprocket 32 to connect it to the first output shaft 12, and the clutch sleeve 37a of synchronizer 37 is engaged with the driven sprocket 35 to connect it to the second output shaft 36. When the second shift fork 42 is shifted to the third position III and retained in position, the clutch sleeve 33 is disengaged from the drive sprocket 32 to disconnect it from the first output shaft 12, an the clutch sleeve 37a of synchronizer 37 is disengaged from the driven sprocket 35 to disconnect it from the second output shaft 36.

Assuming that the manual shift lever is retained in the position H4 in the shift pattern, the clutch sleeve 13 is retained to effect direct connection between the input and output shafts 11 and 12 while the clutch sleeves 33 and 37a are retained to connect the drive and driven sprockets 32 and 35 to the first and second output shafts 12 and 36, respectively. This establishes a high speed four-wheel drive mode. When the manual shift lever is shifted from the position H4 to the position H2 in the shift pattern, the clutch sleeves 33 and 37a are disengaged from the drive and driven sprockets 32 and 35 to disconnect them from the first and second output shafts 12 and 36, respectively. This establishes a high speed two-wheel drive mode. When the manual shift lever is shifted from the position H4 to the position L4 in the shift pattern, the clutch sleeve 13 is disengaged from the externally splined portion 11b of input shaft 11 and engaged with the internal spline 25b of side gear plate 25 to transfer drive power from the input shaft 11 to the first output shaft 12 through the planetary gear assembly 20. This establishes a low speed four-wheel drive mode.

While the planetary gear assembly 20 is operated to provide the low speed four-wheel drive mode, thrust loads on the sun gear 21 and planet gears 23 are absorbed by the housing assembly 14 through the inside thrust bearing 16a, carrier sleeve 24c, and bearing 15b or through the input shaft 11, outside thrust bearing 16b, carrier sleeve 24c and bearing 15b, and thrust loads on the ring gear 22 are absorbed directly by the housing assembly 14.

From the above description, it will be understood that in the power transfer device, the input shaft 11 is axially restrained by the opposite ends of carrier sleeve 24c through the pair of axially spaced thrust bearings 16a and 16b irrespectively of any undesired axial gap caused by accumulation of tolerance of mounting parts for the first output shaft 12. It will be also understood that in the planetary gear assembly 20, the outside thrust bearing 16b can be assembled on the input shaft 11 after the inside thrust bearing 16a has been disposed between the inner end of carrier sleeve 24c and the annular stepped portion 11c of input shaft 11. During assembly process of the outside thrust bearing 16b, undesired axial gap can be eliminated by proper selection of the thickness of stopper plate 17a or snap ring 17b.

Although a specific embodiment of the present invention has been shown and described herein, it is obvious that many modifications and variations thereof are possible in light of these teachings. It is to be understood, therefore, that within the scope of the appended claims, the invention may be practiced otherwise than as specifically described herein.

What is claimed is:

1. A helical planetary gear assembly comprising a housing, a bearing secured to a side wall of said housing, a carrier sleeve coupled with said bearing and being axially and radially restrained by engagement with said bearing, a first shaft rotatably supported by said bearing through said carrier sleeve, a second shaft arranged coaxially with said first shaft for rotation relative thereto, a sun gear fixedly mounted on said first shaft for rotation therewith, a ring gear arranged concentrically with said sun gear and secured to an internal wall of said housing, a planet carrier rotatably arranged between said sun and ring gears, said planet carrier including a body member secured to said carrier sleeve for rotation therewith, a plurality of planet gears rotatably supported by said planet carrier and being in meshing engagement with said sun and ring gears, said gears each being in the form of a helical gear, and a clutch sleeve axially slidably mounted on said second shaft and shiftable between a first position in which it effects a direct drive connection between said first and second shafts and a second position in which it is engaged with said planet carrier for transmitting drive torque from said first shaft to said second shaft through said gears, means for axially restraining said first shaft, said means for axially restraining comprising thrust bearings positioned at opposite ends of said carrier sleeve.

2. A helical planetary gear assembly as recited in claim 1, wherein said bearing secured to said housing is in the form of a radial ball bearing, and said carrier sleeve is coupled with an inner race of said ball bearing for rotation therewith.

3. A helical planetary gear assembly as recited in claim 2, wherein said first shaft is rotatably supported by said carrier sleeve through a radial needle bearing.

4. A helical planetary gear assembly as recited in claim 1, wherein one of said thrust bearings is disposed between one end of said carrier sleeve and an annular stepped portion of said first shaft, and the other thrust bearing is disposed between the other end of said carrier sleeve and a stopper plate fixed to said first shaft.

5. A helical planetary gear assembly comprising a housing, a ball bearing secured to a side wall of said housing, a carrier sleeve coupled with an inner race of said ball bearing and being axially and radially restrained by engagement with the inner race of said ball bearing, an input shaft rotatably supported by said carrier sleeve through a radial bearing, an output shaft arranged coaxially with said input shaft for rotation relative thereto, a sun gear secured to said input shaft for rotation therewith, a ring gear secured to an internal wall of said housing, a planet carrier rotatably arranged between said sun and ring gears, said planet carrier including a body member secured to said carrier sleeve for rotation therewith, a plurality of planet gears rotatably supported by said planet carrier and being in meshing engagement with said sun and ring gears, said gears each being in the form of a helical gear, and a clutch sleeve axially slidably mounted on said output shaft and shiftable between a first position in which it effects a direct drive connection between said input and output shafts and a second position in which it is engaged with said planet carrier for transmitting drive torque from said input shaft to said output shaft through said gears, means for axially restraining said input shaft, said means for axially restraining comprising thrust bearings positioned at opposite ends of said carrier sleeve.

* * * * *